(12) United States Patent
Kobayashi

(10) Patent No.: US 10,590,346 B2
(45) Date of Patent: Mar. 17, 2020

(54) EFFICIENT USE OF BIOMASS IN REGENERATIVE FURNACE FIRING

(71) Applicant: Hisashi Kobayashi, Bedford, NY (US)

(72) Inventor: Hisashi Kobayashi, Bedford, NY (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 16/359,119

(22) Filed: Mar. 20, 2019

(65) Prior Publication Data
US 2019/0316040 A1 Oct. 17, 2019

Related U.S. Application Data

(60) Provisional application No. 62/658,722, filed on Apr. 17, 2018.

(51) Int. Cl.
| | | |
|---|---|---|
| C10B 53/02 | (2006.01) | |
| C01B 3/38 | (2006.01) | |
| C10B 49/16 | (2006.01) | |
| C10G 2/00 | (2006.01) | |
| C01B 3/56 | (2006.01) | |
| C10K 3/02 | (2006.01) | |

(52) U.S. Cl.
CPC ............ *C10B 53/02* (2013.01); *C01B 3/38* (2013.01); *C01B 3/56* (2013.01); *C10B 49/16* (2013.01); *C10G 2/30* (2013.01); *C10K 3/02* (2013.01)

(58) Field of Classification Search
CPC .. C03B 5/235; C03B 5/02; C03B 5/18; C03B 5/225; C03B 5/237; C01B 223/0811; C01B 2203/06; C01B 2203/0233; C10G 2/30

USPC ...... 585/240, 241, 242; 423/418.2, 650, 651, 423/652, DIG. 9, 648.1

See application file for complete search history.

(56) References Cited

U.S. PATENT DOCUMENTS

| | | |
|---|---|---|
| 5,993,203 A | 11/1999 | Koppang |
| 6,113,824 A | 9/2000 | Yamana et al. |
| 6,113,874 A * | 9/2000 | Kobayashi ............ C01B 3/34 252/373 |
| 6,210,157 B1 | 4/2001 | Kobayashi |
| 6,488,076 B1 | 12/2002 | Yasuda et al. |
| 2009/0011290 A1 | 1/2009 | Chudnovsky et al. |
| 2017/0121206 A1 | 5/2017 | Kobayashi |

OTHER PUBLICATIONS

Hanning Li et al: "Evaluation of a biomass drying process using waste heat from process industries: A case study", Applied Thermal Engineering, Pergamon, Oxford, GB, vol. 35, Oct. 9, 2011 (Oct. 9, 2011), pp. 71-80, XP028117168, ISSN: 1359-4311, DOI: 10 .1016/ J. Appl Thermal Eng. 2011.10. 009 [retrieved on Oct. 17, 2011] abstract 4. Estimation of the flue gases usage for biomass drying (p. 74)table 4.

A. Gonzalez et al: "Optimelt(TM) Regenerative Thermo-Chemical Heat Recovery for Oxy-Fuel Glass Furnaces" In: "75th Conference on Glass Problems", Apr. 8, 2015 (Apr. 8, 2015), John Wiley & Sons, Inc., Hoboken, NJ, USA, XP55285013, ISBN: 978-1-119-11747-6 pp. 113-120, DOI:10.1002/9781119117490. ch 10,abstract Optimelt Heat Recovery Process (p. 114).

\* cited by examiner

*Primary Examiner* — Thuan D Dang
(74) *Attorney, Agent, or Firm* — Donald T. Black

(57) ABSTRACT

Efficiency of a thermochemical regeneration combustion system is enhanced by incorporation of gaseous products from pyrolysis of fuel such as biomass.

15 Claims, 7 Drawing Sheets

EFFICIENT USE OF BIOMASS IN REGENERATIVE FURNACE FIRING

RELATED APPLICATIONS

This application claims the benefit of U.S. Provisional Application Ser. No. 62/658,722, filed on Apr. 17, 2018, which is incorporated herein by reference.

FIELD OF THE INVENTION

The present invention relates to combustion in furnaces such as glassmelting furnaces wherein material is fed into the furnace and is heated and/or melted by the heat of combustion that occurs within the furnace.

BACKGROUND OF THE INVENTION

Many combustion processes used in industry rely on combustion of fossil fuels such as natural gas, LPG, or liquids such as fuel oil. While incorporation of fuel from renewable sources, such as biomass, into industrial combustion processes may be a desirable-sounding goal, the practical drawbacks of such incorporation have been found to discourage adoption of combustion of biomass. Such practical drawbacks may include the inadequate BTU content or excessive water content of the biomass fuel, the difficulty of feeding solid biomass into a furnace, and the contamination of the process by solid residues produced by combustion of biomass.

The present invention overcomes these difficulties and presents positive operational possibilities in the design and operation of industrial combustion processes.

BRIEF SUMMARY OF THE INVENTION

One aspect of the present invention is a method of carrying out combustion in a furnace, comprising (A) combusting fuel in a furnace to produce gaseous combustion products, and (B) alternately (1) passing gaseous combustion products from the furnace into and through a cooled first regenerator to heat the first regenerator and cool said gaseous combustion products, pyrolyzing solid or liquid organic fuel such as biomass with heat that is provided from gaseous combustion products from the furnace to form pyrolysis gas that contains CO, H2O, hydrocarbons, and oxygenated hydrocarbons, passing a gaseous reformable mixture comprising said pyrolysis gas into a heated second regenerator and, in the second regenerator, reacting the reformable mixture in an endothermic reaction to form syngas comprising hydrogen and CO and cool the second regenerator, and passing said syngas from the second regenerator into the furnace and combusting it with gaseous oxidant in the furnace, and (2) passing gaseous combustion products from the furnace into and through a cooled second regenerator to heat the second regenerator and cool said gaseous combustion products, pyrolyzing solid or liquid organic fuel such as biomass with heat that is provided from gaseous combustion products from the furnace to form pyrolysis gas that contains CO, H2O, hydrocarbons, and oxygenated hydrocarbons, passing a gaseous reformable mixture comprising said pyrolysis gas into a heated first regenerator and, in the first regenerator, reacting the reformable mixture in an endothermic reaction to form syngas comprising hydrogen and CO and cool the first regenerator, and passing said syngas from the first regenerator into the furnace and combusting it with gaseous oxidant in the furnace.

In another aspect of the present invention, the solid or liquid organic fuel is pyrolyzed with heat that is provided from gaseous combustion products from the furnace that, before pyrolyzing the solid or liquid organic fuel, have been passed through a regenerator to heat the regenerator and cool the gaseous combustion products.

In yet another aspect of the present invention, pyrolysis gas that is passed into the heated second regenerator in step (1) and pyrolysis gas that is passed into the heated first regenerator in step (2), are each in a mixture with gaseous combustion products from the furnace, wherein the mixture is formed by mixing the gaseous combustion products with the pyrolysis gas during the pyrolyzing of the solid or liquid organic fuel (or after the pyrolyzing of the fuel, though this is less preferred).

The present inventor found an improved method utilizing firing of solid or liquid organic fuel such as biomass in glass and other furnaces that enables waste heat recovery using thermochemical regenerators (TCR), for example, as described in U.S. Pat. No. 6,113,824. The basic process concept is to use hot flue gas from an oxy-fuel fired furnace to pyrolyze and partially gasify solid or liquid organic fuel such as biomass. The resulting pyrolysis gas is used as fuel for the furnace or in other furnaces. The main flue gas stream is used in the TCR for waste heat recovery in the normal fashion. A side stream of hot flue gas is introduced into a pyrolyzer chamber in which solid or liquid organic fuel is injected. The resulting gaseous reformable mixture is ducted to the bottom of the reforming chamber of the TCR and is used as the reforming gas mixture for the TCR process in place of (or in addition to) a CH4-recycled flue gas mixture. In this fashion solid or liquid fuel can be used for thermochemical heat recovery. Char particles that form in the pyrolysis are separated and collected in the pyrolyzer and used as a fuel in the same furnace or in other furnaces after appropriate size reduction by using a pulverizer. Some fine char particles may get entrained into the gaseous fuel stream and allowed to enter into the regenerator.

As used herein, "biomass" means algae or material containing any of cellulose or hemicellulose or lignin or animal proteins and fats, including but not limited to Municipal Solid Waste (MSW), sludge, wood (including wood chips, cut timber; boards, other lumber products, and finished wooden articles, and wood waste including sawdust, and pulpwood from any of a variety of trees including birch, maple, fir, pine, spruce), and vegetable matter such as grasses and other crops, as well as products derived from vegetable matter such as rice hulls, rice straw, soybean residue, corn stover, sugarcane bagasse, any animal, fish and bird parts, and trims, and manures.

As used herein, "pyrolysis" means the chemical decomposition of organic (carbon-based) material through the application of heat, in the absence or near absence of oxygen in sufficient amount to combust the material. As used herein, to "pyrolyze", and "pyrolyzing", mean causing pyrolysis.

DETAILED DESCRIPTION OF THE INVENTION

Figure 1A:
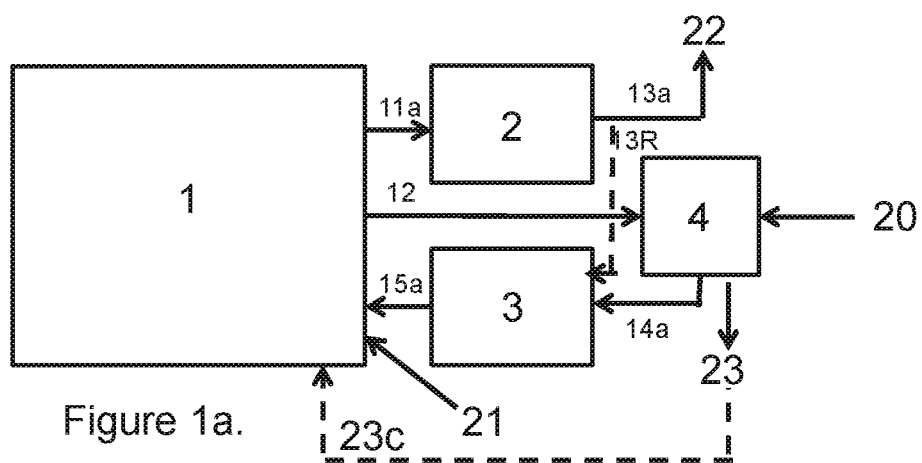
FIGS. 1a and 1b are flowsheets of one embodiment of the present invention.

The present invention employs a heat recovery process ("TCR") which recaptures usable heat from high temperature flue gas exhaust streams. Preferred examples of combustion processes with which the method of this invention can be practiced include glassmelting furnaces, in which glass-forming ingredients are melted together to form molten glass, steel heating furnaces, cement and lime kilns, and other high temperature industrial furnaces.

This heat recovery process employs pairs of regenerators in which each regenerator of a given pair alternates between two cycles, which are referred to herein as the flue cycle and the reforming cycle. These two cycles are performed alternatingly in two or more checker-filled regenerators or in a rotating regenerator with two or more heat storage segments. The heat recovery process is preferably carried out in association with furnaces and other combustion devices which employ "oxy-fuel" combustion processes, i.e. combustion of fuel with gaseous oxidant comprising an oxygen content of at least 50 vol. % oxygen, and preferably at least 80 vol. % oxygen, more preferably at least 90 vol. % oxygen, and even at least 99 vol. % oxygen, because the flue gases produced by oxy-fuel combustion have higher $H_2O$ and $CO_2$ concentrations, both of which promote the endothermic reforming reactions that are utilized in the method of this invention. Reforming reactions include cracking of fuel containing carbon and hydrogen, and any endothermic reactions with $H_2O$ and $CO_2$ to form $H_2$ and $CO$.

When the first regenerator is in the flue cycle, the checkers in the first regenerator extract and store heat from a stream of high temperature gaseous combustion products (flue gas) which is fed from the furnace into and through this regenerator. The flue gas can instead pass through a series of two, three, or more regenerators in the flue cycle. Each regenerator in the flue cycle is heated by the flue gas, which is cooled by this transfer of heat.

At the same time, another (second) regenerator is in the reforming cycle, in which a gaseous composition (referred to herein as "reformable mixture") is fed into and through the (second) regenerator, which has previously been heated, wherein components of the reformable mixture undergo endothermic reaction to form syngas as described herein. The reformable mixture includes pyrolysis gas that is formed by pyrolysis of biomass which is described herein. The reformable mixture may also contain some flue gas that has passed out of the furnace. This flue gas can be mixed with the pyrolysis gas during the pyrolysis that forms the pyrolysis gas, or can be mixed with the pyrolysis gas after the pyrolysis of the biomass (or other pyrolyzable organic liquid or solid fuel) which forms the pyrolysis gas. This flue gas can be passed directly into mixture with the pyrolysis gas, or (as a preferred practice) before this flue gas is mixed with pyrolysis gas the flue gas can be passed through a regenerator to cool the flue gas and heat the regenerator.

The reformable mixture can also optionally contain fuel (referred to herein as Reforming Fuel or RF), such as methane ($CH_4$) or any other combustible gas, gas mixture, or vaporized liquid fuels including, but not limited to, natural gas, propane, alcohols, and LPG (liquefied petroleum gas). The overall atomic ratio of the reformable mixture, including flue gas and optional fuel is expressed as $C_xH_yO_z$, wherein x is 1 to 40, y is 2 to (4x), and z is greater than x/4 and less than ((2x)+(y/2)). Preferably z is greater than x/2 and less than (x+(y/4)).

In the reforming cycle, the reformable mixture enters the second regenerator in which the checker has already been heated, as described herein, and flows through it towards the furnace. The temperature of the reformable mixture passing through the second regenerator continues to increase by extracting heat from the already pre-heated checker. As the reformable mixture passes through the second regenerator, it reaches a temperature at which reforming reactions begin to occur and continue to occur, producing products including $H_2$ and $CO$. The reforming reactions are endothermic and the heat needed to promote the reforming reactions is absorbed from the heated checker. The gaseous composition that is produced by the reforming reactions typically comprises one or more components such as $H_2$, $CO$, unreacted gases comprising $H_2O$, $CO_2$, $CH_4$, nitrogen, and soot. The gaseous composition thus produced may also be called "syngas" herein. The syngas emerges from the second regenerator into the furnace and is combusted in the furnace with oxidant to provide thermal energy for heating and/or melting material in the furnace.

After a length of time, the operation of the two regenerators is reversed, i.e., the regenerator that was operating in the flue cycle is switched to the reforming cycle, and the regenerator that was used in the reforming cycle is switched to the flue cycle. After a further period of time, the operation of the two regenerators is reversed again. The timing of the reversals can be determined by elapsed time, or by other criteria such as the temperature of the flue gas exiting from the first regenerator that is in flue cycle. The reversal process is carried out according to a predetermined mechanism and plan, wherein valves are sequenced to open and close based on specific timings.

The operation and control of the present invention is described below in conjunction with the Figures. An end-port fired glass furnace represented as 1 and fitted with two regenerators 2 and 3 in end wall is used as an example. However, the operation described herein of a pair of regenerators can be carried out in the same manner when the pair of regenerators are side by side on one side of furnace 1 or are positioned on opposite sides of furnace 1.

FIG. 1*a* shows a process flow sheet for an embodiment of the subject invention. Furnace 1 is fired by combustion of gaseous oxidant 21 with syngas that is formed in left regenerator 3 and fed as stream 15*a* to furnace 1. In one cycle of the operation, a stream 11*a* of flue gas from furnace 1 is passed from the furnace into and through right regenerator 2 to heat the interior passages of regenerator 2 and cool this stream of flue gas. The cooled flue gas 13*a* that passes out of regenerator 2 is exhausted to stack 22, optionally after passing through flue gas emission control system such as a filter (not shown).

A second stream 12 of flue gas is passed from furnace 1 into pyrolyzer 4 into which a solid or liquid fuel 20 such as biomass is also fed. Fuel 20 is pyrolyzed in pyrolyzer 4 by heat that is provided from the flue gas, due to the high temperature of the flue gas, and fuel 20 is partially gasified to form pyrolysis gas. Pyrolysis of the fuel 20 is caused by heat that is provided from the flue gas 12, either by direct heat exchange (meaning that there is no structure between the fuel and the flue gas, which is preferred), or by indirect heat exchange, meaning that there is a physical structure between the fuel 20 and the flue gas and the heat passes through the structure from the flue gas to the fuel 20. Preferably, the pyrolysis gas may react with O2, H2O and CO2 contained in the flue gas 12. Solid residue from the pyrolyzer is removed as char 23 and may optionally be injected into the furnace 1 (shown as stream 23c) as supplemental fuel, preferably after being pulverized to small particle sizes, and combusted with supplemental oxidant (not shown).

Reformable mixture 14a, which contains pyrolysis gas and may also contain flue gas, passes from pyrolyzer 4 into left regenerator 3 which is in a reforming cycle. That is, the interior passages of regenerator 3 have previously been heated by passage of flue gas from the furnace through regenerator 3, before the flows were reversed to the cycle presently being described. The reformable mixture including pyrolysis gas is reformed in regenerator 3 by endothermic reactions, drawing heat for reaction from regenerator 3, and forms heated syngas 15a which is passed into furnace 1 and combusted with gaseous oxidant 21. Gaseous oxidant that is used for combustion of the syngas in furnace 1 can be air, or it can have an oxygen content higher than that of air, i.e. greater than 21 vol. % oxygen and preferably equal to or higher than 80 vol. %, more preferably equal to or higher than 90 vol. %, or even at least 99 vol. % oxygen.

Figure 1B:
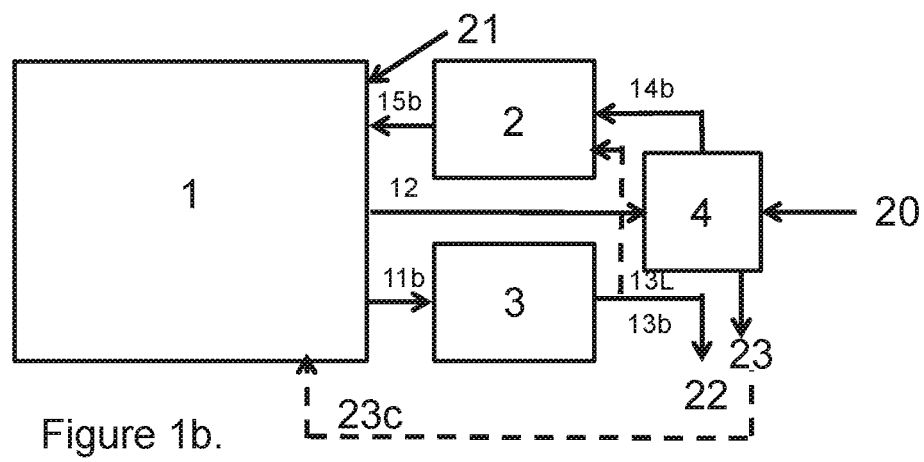

After right regenerator 2 is sufficiently heated, the operation is carried on with the functions of the regenerators 2 and 3 reversed, so that the flows described with respect to FIG. 1a now occur as shown in FIG. 1b. Preferably, before the reversed flows begin, a purging cycle is carried out in which the injection of fuel 20 into pyrolyzer 4 is stopped, and the flow of the reformable mixture 14a (containing pyrolysis gas) to left regenerator 3 as shown in FIG. 1a is stopped. A portion 13R (not shown) of the flue gas 13a passing out of right regenerator 2 is diverted and injected into left regenerator 3 to purge the residual reformable mixture, pyrolysis gas and syngas from within left regenerator 3.

After the cycle shown in FIG. 1a, and any purging, is completed, the regenerators are operated in flue cycle and reforming cycle as shown in FIG. 1b.

That is, furnace 1 is fired by combustion of gaseous oxidant 21 with syngas that is formed in right regenerator 2 and fed as stream 15b to furnace 1. In this cycle of the operation, a stream 11b of flue gas from furnace 1 is passed from the furnace into and through left regenerator 3 to heat the interior passages of regenerator 3 and cool this stream of flue gas. The cooled flue gas 13b that passes out of regenerator 3 is exhausted to stack 22, optionally after passing through flue gas emission control system such as a filter (not shown).

In this cycle, second stream 12 of flue gas is passed from furnace 1 into pyrolyzer 4 into which a solid or liquid fuel 20 such as biomass is also fed. Fuel 20 is pyrolyzed in pyrolyzer 4 by heat that is provided from the flue gas, due to the high temperature of the flue gas. As described above for the previous cycle, fuel 20 is partially gasified to form pyrolysis gas, by heat that is provided from the flue gas 12, either by direct heat exchange or by indirect heat exchange. Solid residue from the pyrolyzer is removed as char 23 and may optionally be injected into the furnace 1 (shown as stream 23c) as supplemental fuel (preferably after being pulverized to small particle sizes).

Reformable mixture 14b, which contains pyrolysis gas and may also contain flue gas, passes from pyrolyzer 4 into right regenerator 2 which is in a reforming cycle. That is, the interior passages of regenerator 2 have previously been heated by passage of flue gas from the furnace through regenerator 2, before the flows were reversed to the cycle presently being described. The reformable mixture including pyrolysis gas is reformed in regenerator 2 by endothermic reactions, drawing heat for reaction from regenerator 2, and forms heated syngas 15b which is passed into furnace 1 and combusted with gaseous oxidant 21. Gaseous oxidant that is used for combustion of the syngas in furnace 1 can be air, or it can have an oxygen content higher than that of air, i.e. greater than 21 vol. % oxygen and preferably equal to or higher than 80 vol. %, more preferably equal to or higher than 90 vol. %, or even at least 99 vol. % oxygen.

When the temperature of regenerator 2 has become sufficiently high during this cycle, operation is discontinued and purging is preferably carried out in which the injection of fuel 20 into pyrolyzer 4 is stopped, the flow of the reformable mixture 14 (containing pyrolysis gas) to right regenerator 2 as shown in FIG. 1b is stopped, a portion 13L of the flue gas 13b passing out of left regenerator 3 is diverted and injected into right regenerator 2 to purge the residual reformable mixture, pyrolysis gas and syngas from within right regenerator 2. Then operation is resumed as described herein with respect to FIG. 1a.

In the pyrolysis, preferably fuel 20 is dried biomass with moisture content less than 30%. More preferably fuel 20 is dried biomass with moisture content less than 10%. Most preferably fuel 20 is dried biomass with moisture content less than 5%. The flow rate of hot flue gas 12 introduced into the pyrolyzer is adjusted depending on the heat requirement of fuel 20 to pyrolyze at least 50%, preferably 70% and more preferably 80% of the dry weight of the fuel 20 into pyrolysis gas. The temperature of reformable mixture 14 (including pyrolysis gas) introduced into regenerator 2 or 3 is kept above the condensation temperature of pyrolysis gas to avoid formation of tars and liquors from pyrolysis. Preferably the temperature of reformable mixture 14a or 14b introduced into regenerator 2 or 3 is in a range between 200 C and 600 C. More preferably the temperature of reformable mixture 14a or 14b introduced into regenerator 2 or 3 is in a range between 200 C and 400 C.

Figure 2A:
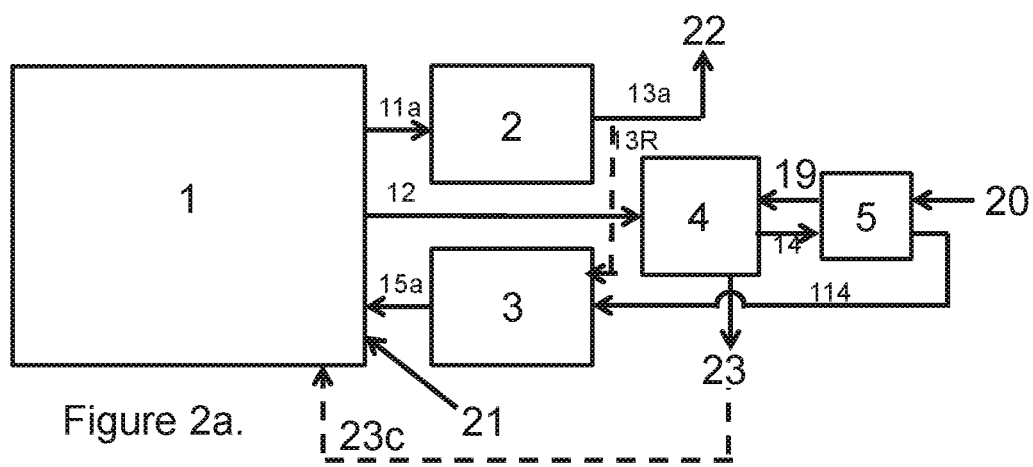
FIGS. 2a and 2b are flowsheets of another embodiment of the present invention.
Figure 2B:
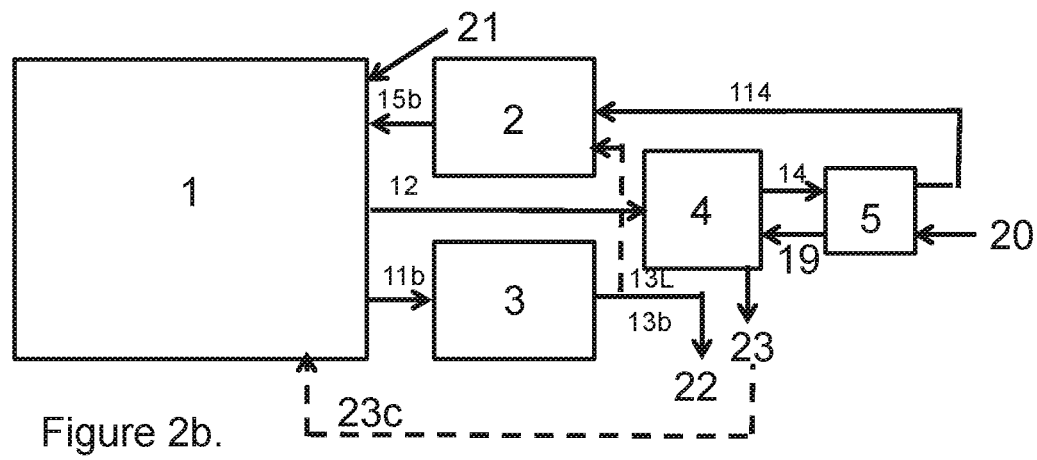

FIGS. 2a and 2b depict another embodiment which is similar to the embodiment of FIGS. 1a and 1b, with the addition of dryer 5 and related lines. In this embodiment, fuel 20 is fed into dryer 5. Reformable mixture 14 passes from pyrolyzer 4 into dryer 5, where the heat of mixture 14 reduces the moisture content of fuel 20. Dried fuel 19 (meaning that its moisture content has been reduced relative to its moisture content before entering dryer 5, and preferably reduced to zero) passes from dryer 5 into pyrolyzer 4 wherein the dried fuel is pyrolyzed. Stream 114 of reformable mixture, which may have been cooled by passing through dryer 5, and which may have additional portions of H2O, passes from dryer 5 into regenerator 3 (in FIG. 2a) to undergo reforming reactions to form syngas. Dryer 5 may also be operated in the torrefaction temperature range of 200 C to 300 C not only to fully vaporize moisture contained in fuel 20, but also to decompose 5 to 10% by weight of fuel 20.

Figure 3:
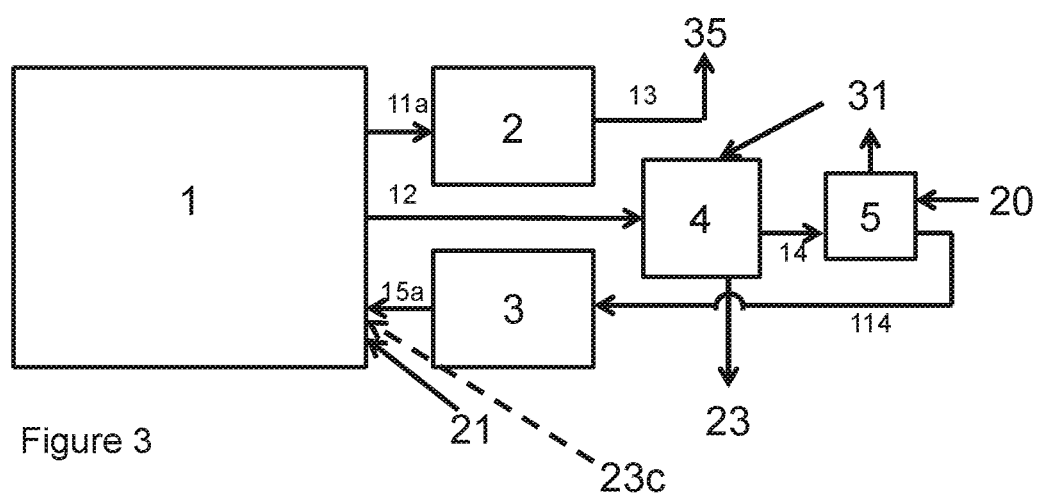
FIG. 3 is a flowsheet of another embodiment of the present invention.

FIG. 3 is a flowsheet showing one cycle of a 300 tpd container glass furnace incorporating the present invention integrated with a wood pyrolyzer-dryer system and a thermochemical regenerator system. The furnace is fed with glass forming batch material and cullet (50% wt), both with a moisture content of 2.5% (not shown). The furnace is fired with heated syngas stream 15a (in the cycle that is depicted), optional pulverized char particles stream 23c and oxidant stream 21 which preferably contains more than 50% vol O2 (oxygen), more preferably contains more than 75% O2, and most preferably contains more than 90% O2. The furnace is equipped with thermochemical regenerators 2 and 3 to recover a portion of the sensible heat of the flue gas from the furnace (stream 11a). A wood pyrolyzer 4 and a wood dryer 5 are also installed to recover a portion of the sensible heat of the flue gas from the furnace (stream 12). Fuel 20, which in this example comprises wood with moisture content of 20% wt is fed into dryer 5 and heated by pyrolysis gas stream 14 from the pyrolyzer 4. Moisture and fume generated in the dryer 5 is mixed with pyrolysis gas stream 14 to form cooled reformable mixture stream 114, which is introduced into regenerator 3 for heat recovery and syngas formation. Preferably dryer 5 is a direct contact unit. Dried wood or torrefied wood 31 is introduced into pyrolyzer 4, after optional size reduction to 90% less than 1 mm, preferably 90% less than 0.5 mm in a separate unit (not shown), and heated by flue gas stream 12. The wood is pyrolyzed to form a pyrolysis gas stream 14 which is a mixture of flue gas stream 12 from the furnace and pyrolysis gases, vapors and fine char particles from wood. A preferred pyrolyzer unit is an entrained flow unit to rapidly mix hot flue gas with fine wood particles with an optional cyclone to separate char particles. Another preferred pyrolyzer unit is a fluidized bed unit as described in publicly available publications. Char particles stream 23 separated in pyrolyzer 4 is removed for pulverization to produce pulverized char particles which as stream 23c may optionally be combusted in furnace 1, or may be partially recycled to pyrolyzer 4 for further pyrolysis (not shown). The flows through regenerators 2 and 3 are periodically reversed, in the manner described above. Table 1 lists the calculated mass flow rate and temperature of each of the streams 11 to 20.

TABLE 1

Mass flow rate and temperature for a 300 tpd Container Glass Furnace

| Stream number | Stream name | mass flow (lb/hr) | temperature (F.) |
|---|---|---|---|
| 20 | Wet wood (20% H2O) | 8,330 | 77 |
| 31 | dry wood (5% H2O) | 7,260 | 250 |
| 23 | Char | 1,032 | 300 |
| 23c | Pulverized char | 1,032 | 100 |
| 21 | Oxidant(91% O2) | 11,179 | 77 |
| 11a | Hot flue gas | 22,834 | 2,732 |
| 12 | Hot flue gas | 7,307 | 2,732 |
| 13 | Cooled flue gas | 22,834 | 1,200 |
| 14 | Pyrolysis gas | 13,535 | 925 |
| 114 | Cooled Pyrolysis gas | 14,223 | 428 |
| 15a | Hot syngas | 14,223 | 2,191 |

Figure 4A:
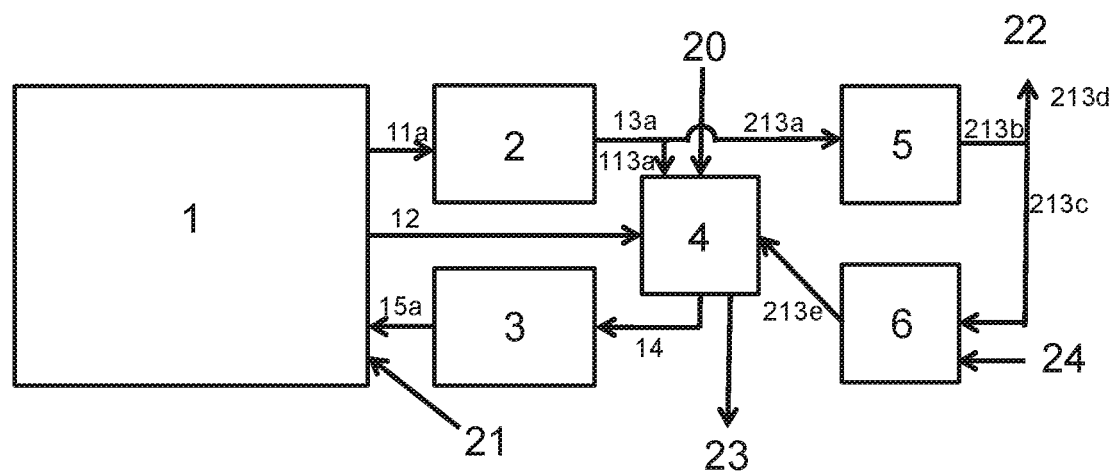
FIGS. 4*a* and 4*b* are flowsheets in which several other embodiments of the present invention can be illustrated.
Figure 4B:
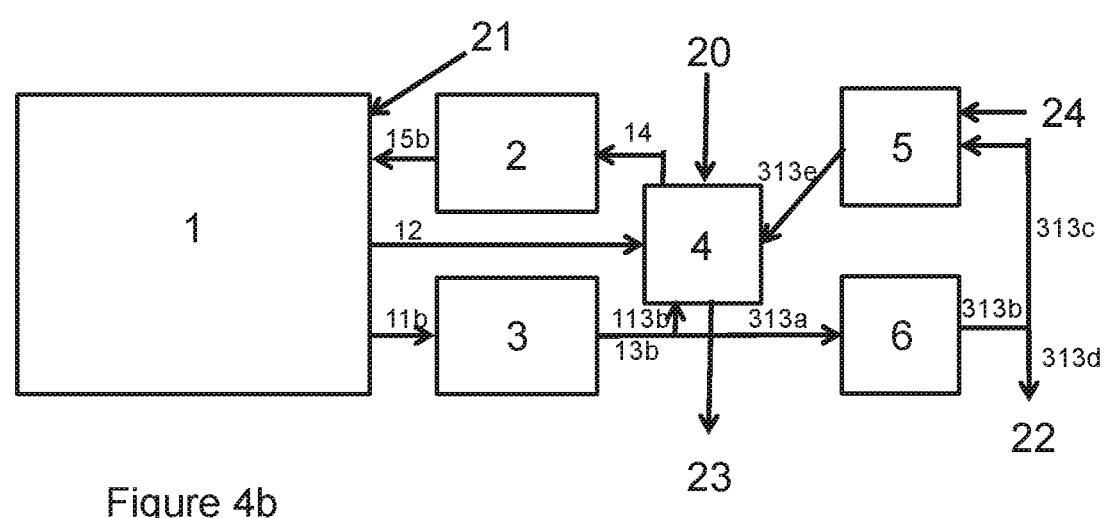

FIGS. 4a and 4b are useful to show several embodiments of the invention in which flue gas that is fed to pyrolyzer 4 to pyrolyze fuel 20 is passed through one or more regenerators before being fed to pyrolyzer 4. These embodiments employ one, two, or more than two pairs of regenerators. Each of these embodiments can include passing flue gas 12 directly from furnace 1 to pyrolyzer 4, or can be practiced with no flows of flue gas 12 from furnace 1 to pyrolyzer 4.

In the cycle shown in FIG. 4a, hot flue gas 11a from the furnace 1 is first introduced into and through high temperature regenerator 2. The partially cooled flue gas 13a from high temperature regenerator 2 can be partially passed as stream 113a to pyrolyzer 4, and the remaining flue gas passes as stream 213a to regenerator 5. Flue gas passing through regenerator 5 heats regenerator 5 and is cooled by this heat transfer. Stream 213b which passes out of regenerator 5 partially passes to stack 22 as stream 213d and the remaining stream 213c passes into regenerator 6. Additional reforming gas 24 containing H2O and/or CO2 is optionally introduced into regenerator 6. Flue gas 213c and reforming gas 24 that passes into regenerator 6 cools the interior of regenerator 6 and is heated, and passes out of regenerator 6 as heated gas stream 213e which is passed into pyrolyzer 4.

Fuel 20 is fed into pyrolyzer 4 and is pyrolyzed there by heat from any of streams 12, 113a, and 213e that have been passed into pyrolyzer 4. Reformable mixture 14 which includes pyrolysis gas as well as flue gas, and any reaction products therefrom, which is formed by pyrolysis in pyrolyzer 4, is introduced into regenerator 3 to heat and reform reformable mixture 14 to produce hot syngas 15a, which is introduced into the furnace and combusted with oxygen 21 injected into furnace 1.

After high temperature regenerator 2 is sufficiently heated, feeding of fuel 20 and any of the partially cooled flue gas streams into pyrolyzer 4 is stopped and a purging cycle starts. Cooled flue gas, stream 213c is recycled to low temperature regenerator 6 and preheated. The resulting preheated recycled flue gas stream is used to purge residual pyrolysis gas and syngas out of high temperature regenerator 3 into the furnace to be combusted with oxygen 21. After the purging cycle is completed, the functions of the right and left regenerators are reversed. Then, flue gas 11b from furnace 1 passes through regenerator 3 to heat regenerator 3. Stream 13b that leaves regenerator 3 can be partially passed as stream 113b to pyrolyzer 4, and any that does not pass to pyrolyzer 4 constitutes stream 313a which partially pases to stack 22 as stream 313d through regenerator 6 and the remaining stream 313c passes through regenerator 5, flowing as streams 313b, 313c, 313d and 313e in the manner analogous to the various optional streams in FIG. 4a. An advantage of having the flexibility to pass flue gas streams through one regenerator or more than one regenerator, and being able to adjust the amounts of flue gas that are in the different streams, is that the operator is given the ability to control the balance of heat and the temperature within pyrolyzer 4. The flows of gas into the various lines shown can be controlled in conventional manner by appropriate valves and controls for the valves.

Figure 5:
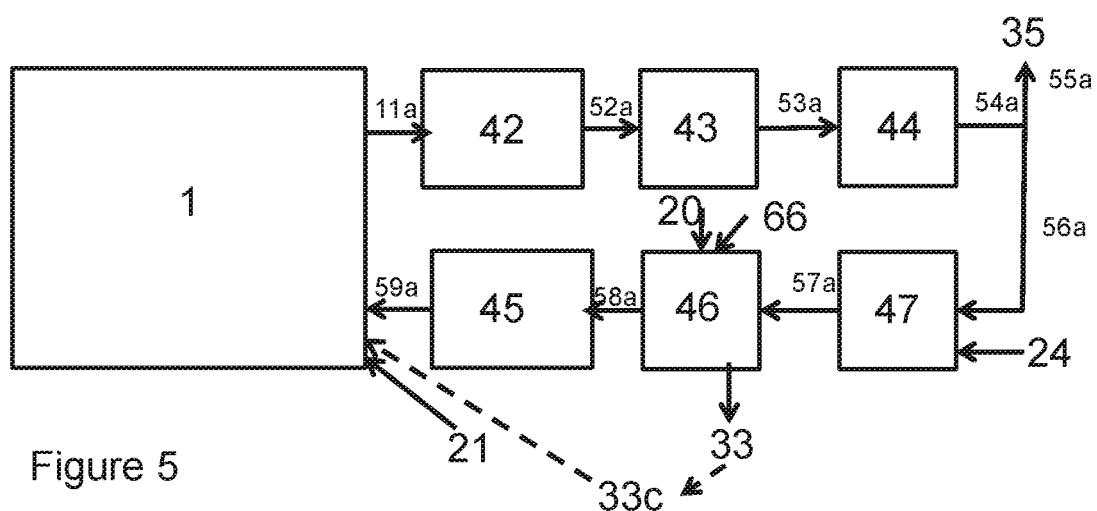
FIG. 5 is a flowsheet of another embodiment of the present invention.
Figure 6A:
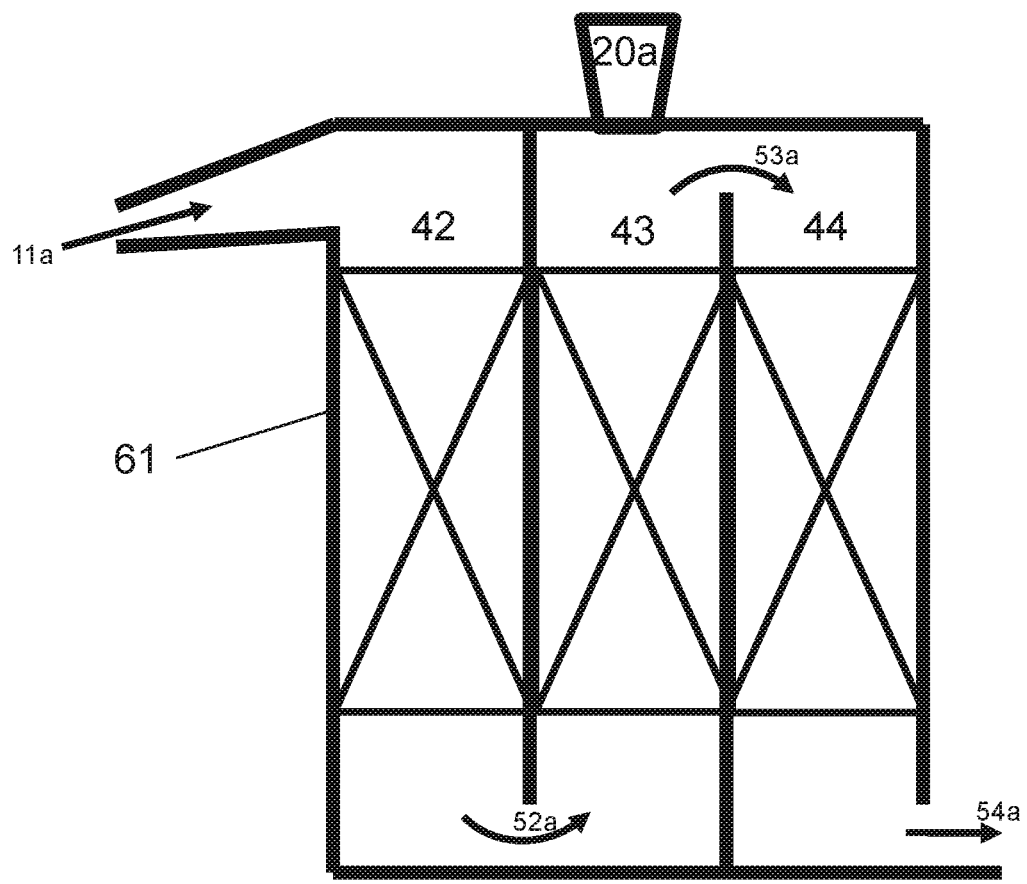
FIGS. 6*a* and 6*b* are cross-sectional views of apparatus with which the embodiment of FIG. 5 can be practiced.
Figure 6B:
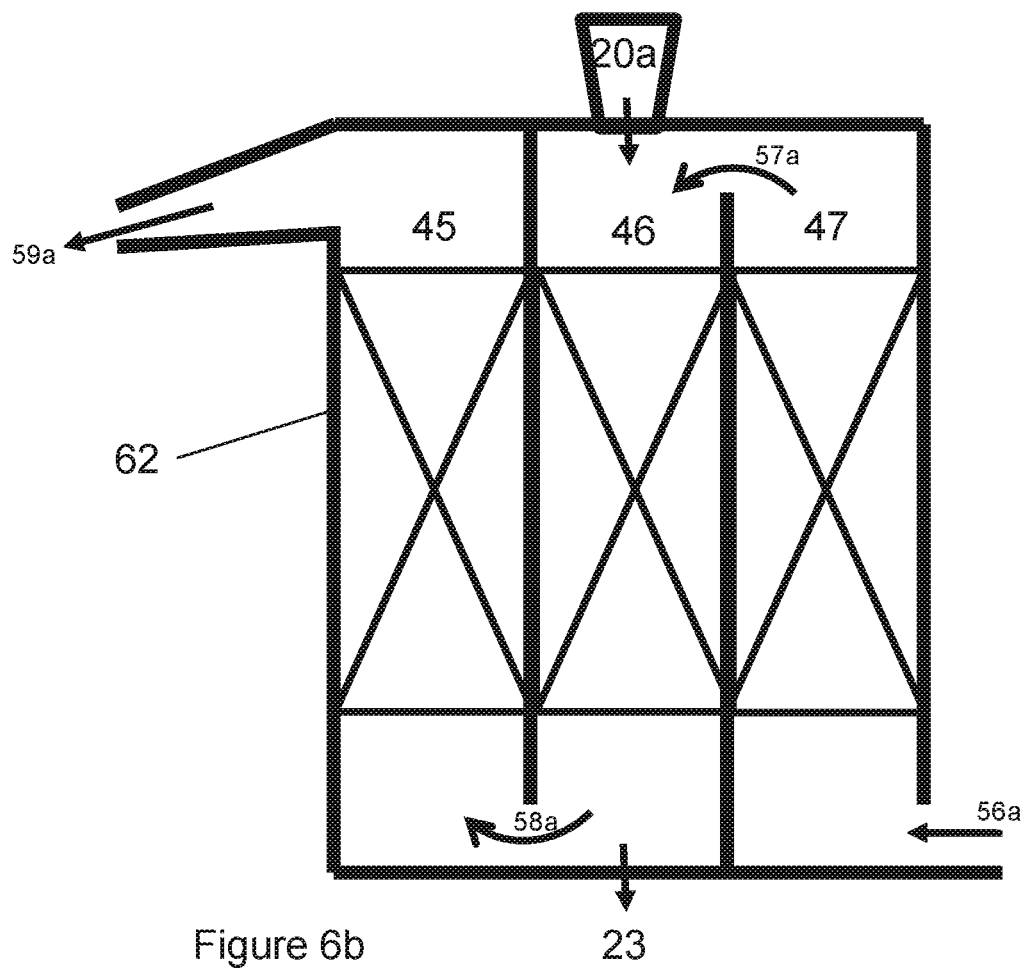

FIGS. 5 and 6a and 6b show another embodiment of the invention, in which flue gas that is fed to a pyrolyzer to pyrolyze fuel is passed through a regenerator before being fed to the pyrolyzer. This embodiment employs a pair of three-pass regenerators 61 and 62 which have each been modified to provide a pyrolyzer in the second-pass chamber. Each three-pass regenerator consists of three checker chambers connected in series, depicted in FIG. 6a as 42, 43 and 44 on the right regenerator and depicted in FIG. 6b as 45, 46, and 47 on the left regenerator. In the cycle shown in FIG. 6a, hot flue gas stream 11a is first introduced into and through high temperature regenerator chamber 42 (first pass), typically in a downward flow. The partially cooled flue gas 52a from high temperature regenerator chamber 42, then flows to the second-pass chamber 43 and typically flows upward. The further cooled flue gas 53a from the second pass regenerator 43, then flows to the third pass chamber 44 and typically flows downward. The cooled flue gas 54a from the third pass regenerator chamber 44, then split into two streams 55a and 56a. The main flue gas stream 55a is exhausted into a stack 35. A flue gas side stream 56a is introduced into the third-pass regenerator chamber 47 of the left regenerator and flows upward. Additional reforming gas 24 containing H2O and/or CO2 is optionally introduced into the third-pass regenerator chamber 47 and heated in the regenerator. The partially heated flue gas 57*a* from the third-pass regenerator 47, then flows to the second-pass chamber/pyrolyzer 46, and typically flows downward. Fuel 20 is fed through port 20*a* into the second-pass chamber/pyrolyzer 46 (which is constructed with heat storing pyrolyzer checker and which has been heated in the previous cycle), and is pyrolyzed. Reformable mixture 58*a* which includes pyrolysis gas as well as flue gas 57*a*, and any reaction products therefrom, is introduced into the first-pass regenerator chamber 45 to heat and reform reformable mixture 58*a* to produce hot syngas 59*a*, which is introduced into the furnace and combusted with oxygen 21 injected into furnace 1. Char 33 from the second-pass regenerator chamber/pyrolyzer 46 is removed and optionally pulverized and injected into furnace 1 as pulverized char fuel 33*c*.

After high temperature regenerator 42 is sufficiently heated, feeding of fuel 20 stops and a purging cycle starts. The flue gas side stream 56*a* continues to flow into the third-pass regenerator chamber 47, the second-pass regenerator chamber/pyrolyzer 46, and the first-pass regenerator chamber 45 of the left regenerator to purge the residual pyrolysis gas and syngas from the left regenerator chambers into the furnace. Injection of oxidant 21 into furnace 1 continues to combust residual syngas being purged into the furnace. Optionally oxidant 66 is introduced into the second-pass regenerator chamber/pyrolyzer 46 or into the third-pass regenerator chamber during the purge cycle to gasify tar, soot and char particles that have become deposited on the checker surfaces and chamber walls. After the purging cycle is completed, the functions of the right and left regenerators are reversed and the flows of gases through the regenerators are reversed, and the pyrolysis is carried out in chamber 43.

What is claimed is:

1. A method of carrying out combustion in a furnace, comprising
   (A) combusting fuel in a furnace to produce gaseous combustion products, and
   (B) alternately
   (1) passing gaseous combustion products from the furnace into and through a cooled first TCR (thermochemical regenerator) to heat the first TCR and cool said gaseous combustion products, pyrolyzing solid or liquid organic fuel with heat that is provided from gaseous combustion products from the furnace to form pyrolysis gas that contains CO, $H_2O$, hydrocarbons, and oxygenated hydrocarbons, passing a gaseous reformable mixture comprising said pyrolysis gas into a heated second TCR and, in the second TCR, reacting the reformable mixture in an endothermic reaction to form syngas comprising hydrogen and CO and cool the second TCR, and passing said syngas from the second TCR into the furnace and combusting it with gaseous oxidant in the furnace, and
   (2) passing gaseous combustion products from the furnace into and through the cooled second TCR to heat the second TCR and cool said gaseous combustion products, pyrolyzing solid or liquid organic fuel such as biomass with heat that is provided from gaseous combustion products from the furnace to form pyrolysis gas that contains CO, $H_2O$, hydrocarbons, and oxygenated hydrocarbons, passing a gaseous reformable mixture comprising said pyrolysis gas into the heated first TCR and, in the first TCR, reacting the reformable mixture in an endothermic reaction to form syngas comprising hydrogen and CO and cool the first TCR, and passing said syngas from the first TCR into the furnace and combusting it with gaseous oxidant in the furnace.

2. A method according to claim 1 wherein the liquid or solid organic fuel is pyrolyzed with heat that is provided from gaseous combustion products from the furnace that, before pyrolyzing the liquid or solid organic fuel, have been passed through a TCR to heat the TCR and cool the gaseous combustion products.

3. A method according to claim 1 wherein pyrolysis gas that is passed into the heated second TCR in step (1) and pyrolysis gas that is passed into the heated first TCR in step (2), are each in a mixture with gaseous combustion products from the furnace, wherein the mixture is formed by mixing the gaseous combustion products with the pyrolysis gas during the pyrolyzing of the liquid or solid organic fuel.

4. A method according to claim 1 wherein the liquid or solid organic fuel comprises biomass.

5. A method according to claim 4 wherein the biomass that is pyrolyzed contains less than 30% moisture.

6. A method according to claim 4 wherein the biomass that is pyrolyzed contains less than 10% moisture.

7. A method according to claim 4 wherein the biomass that is pyrolyzed contains less than 5% moisture.

8. A method according to claim 1 wherein the regenerators are purged of syngas and reformable mixture between steps (1) and (2).

9. A method according to claim 1 wherein the solid or liquid organic fuel is subjected to a drying step wherein its moisture content is reduced, before it is pyrolyzed.

10. A method according to claim 1 wherein hydrocarbon fuel is added to the reformable mixture before the reformable mixture is passed into the TCR(s) used for reforming.

11. A method according to claim 1 wherein no additional hydrocarbon fuel is added to the reformable mixture before the reformable mixture is passed into the TCR(s) used for reforming.

12. A method according to claim 1 wherein the temperature of pyrolysis gas that is passed into the TCR(s) used for reforming is in a range between 200 C and 600 C.

13. A method according to claim 1 wherein the temperature of pyrolysis gas that is passed into the TCR(s) used for reforming is in a range between 200 C and 400 C.

14. A method according to claim 1 wherein the overall atomic ratio of the reformable mixture, including flue gas and optional fuel that is present, is expressed as $C_xH_yO_z$, wherein x is 1 to 40, y is 2 to (4x), and z is greater than x/4 and less than $((2x)+(y/2))$.

15. A method according to claim 1 wherein the overall atomic ratio of the reformable mixture, including flue gas and optional fuel that is present, is expressed as $C_xH_yO_z$, wherein x is 1 to 40, y is 2 to (4x), and z is greater than x/2 and less than $(x+(y/4))$.

* * * * *